United States Patent

King

[15] 3,653,258
[45] Apr. 4, 1972

[54] APPARATUS FOR MEASURING LOADS IN ROPES

[72] Inventor: Henry King, Langley, England

[73] Assignee: Fulmer Research Institute Limited, Stoke Poges, Buckinghamshire, England

[22] Filed: Nov. 4, 1970

[21] Appl. No.: 86,992

Related U.S. Application Data

[63] Continuation of Ser. No. 741,472, July 1, 1968, abandoned.

[30] Foreign Application Priority Data

July 13, 1967  Great Britain.......................32,398/67

[52] U.S. Cl...............................................73/144
[51] Int. Cl..........................................G01l 5/04
[58] Field of Search...................................73/144

[56] References Cited

UNITED STATES PATENTS

| | | | |
|---|---|---|---|
| 2,183,817 | 12/1939 | Mathey | 73/144 |
| 2,200,572 | 5/1940 | Bolen | 73/144 |
| 2,319,299 | 5/1943 | Converse | 73/141 A |
| 2,471,999 | 5/1949 | Boos | 73/144 |
| 2,795,136 | 6/1957 | Matt | 73/144 |
| 2,986,932 | 6/1961 | Melton | 73/144 |
| 3,310,981 | 3/1967 | Nixon et al. | 73/144 |
| 3,398,575 | 8/1968 | Saxl | 73/144 |

*Primary Examiner*—Charles A. Ruehl
*Attorney*—Stevens, Davis, Miller & Mosher

[57] ABSTRACT

Apparatus for measuring the loading of a rope comprising three rope engagement members spaced along a resilient support for engaging opposite sides of the rope, one of said members being carried on a carrier and being displaceable by eccentric pivotation or sliding on the carrier, upon movement of an adjustment member, to deflect the rope, means being provided for measuring distortion of the resilient support in response to the rope deflection.

16 Claims, 9 Drawing Figures

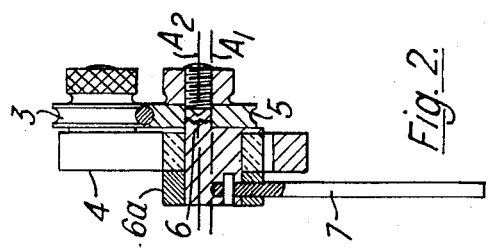
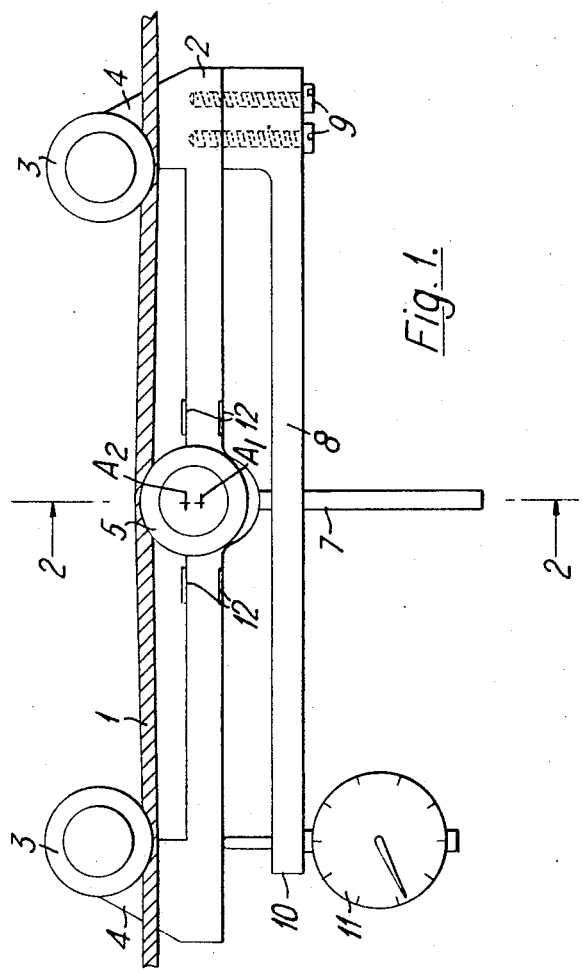

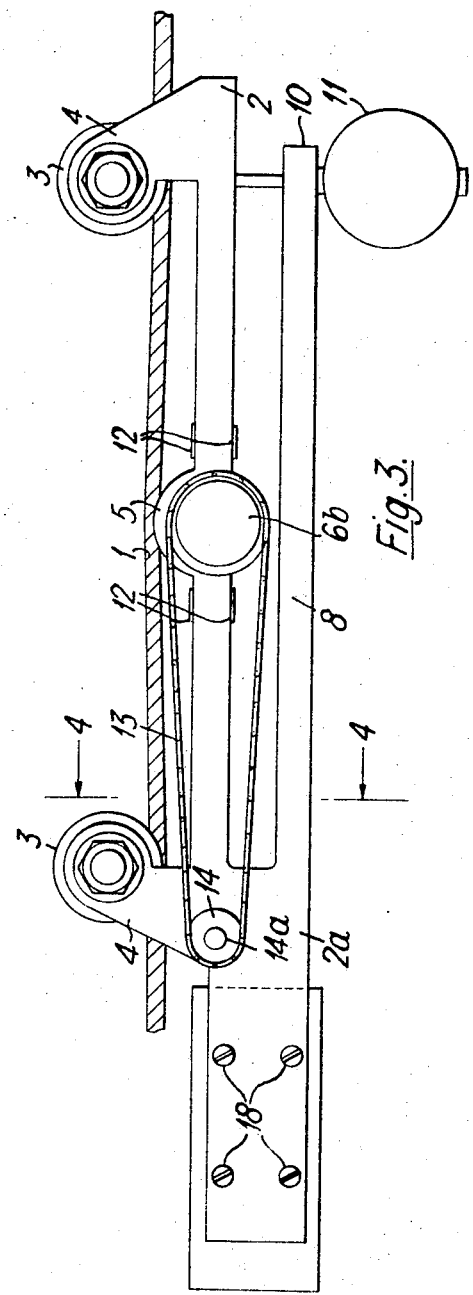
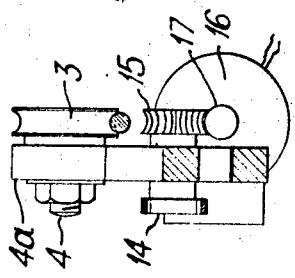
Fig. 3.
Fig. 4.

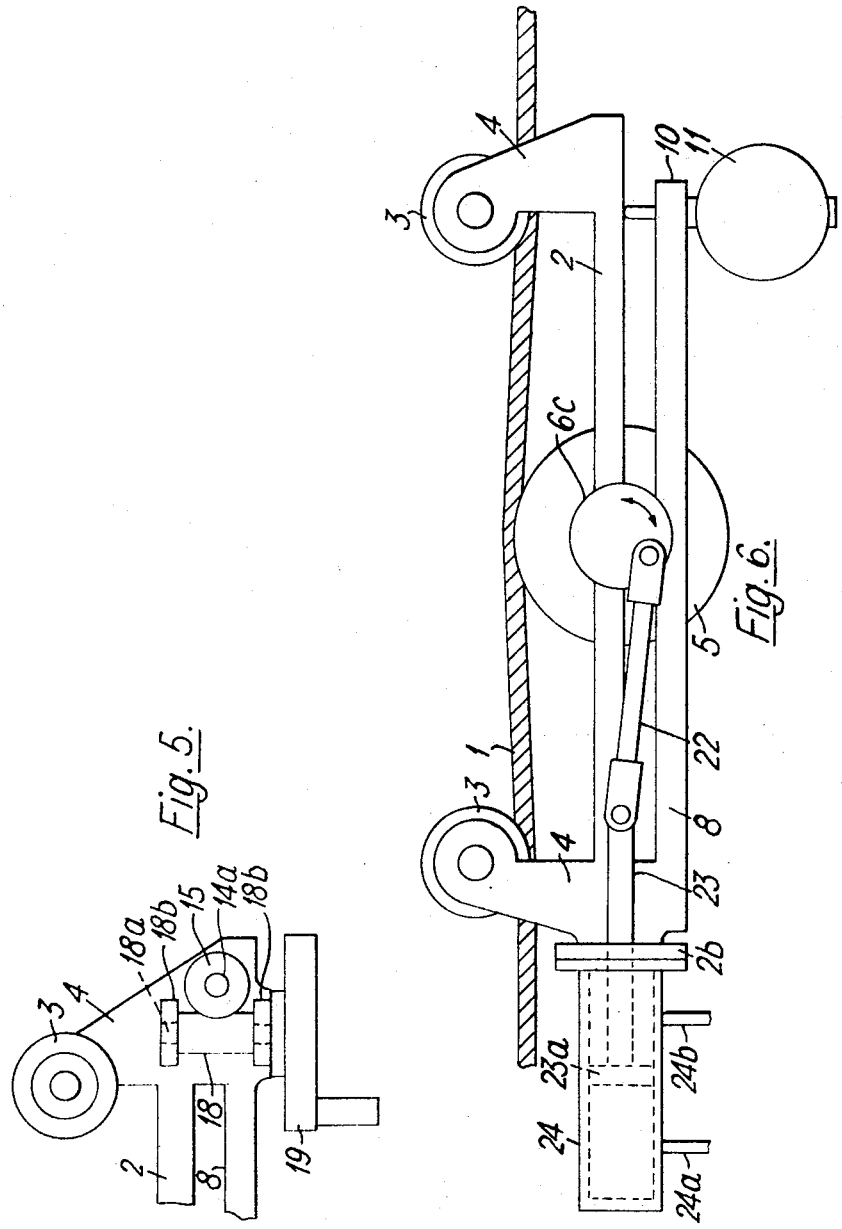

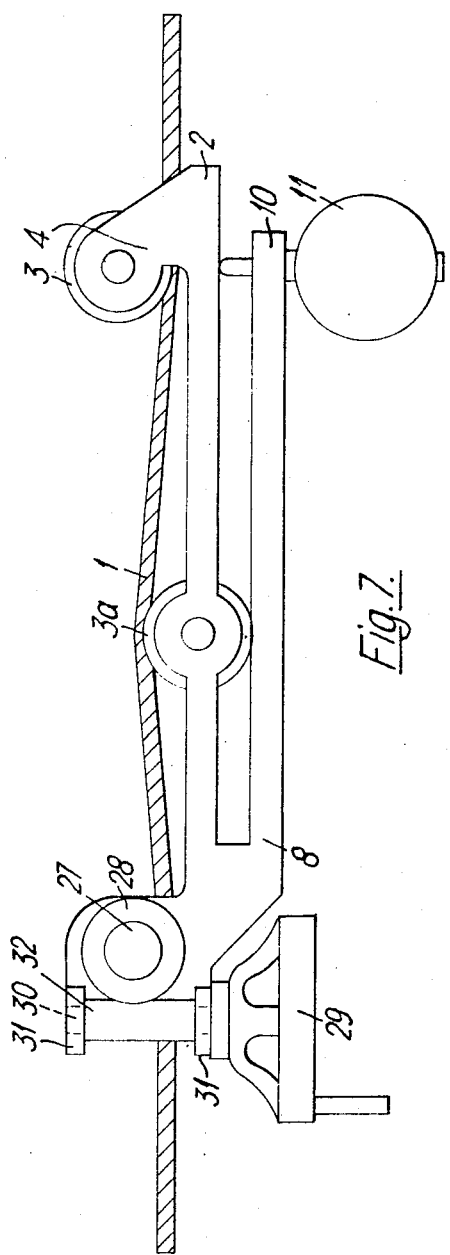

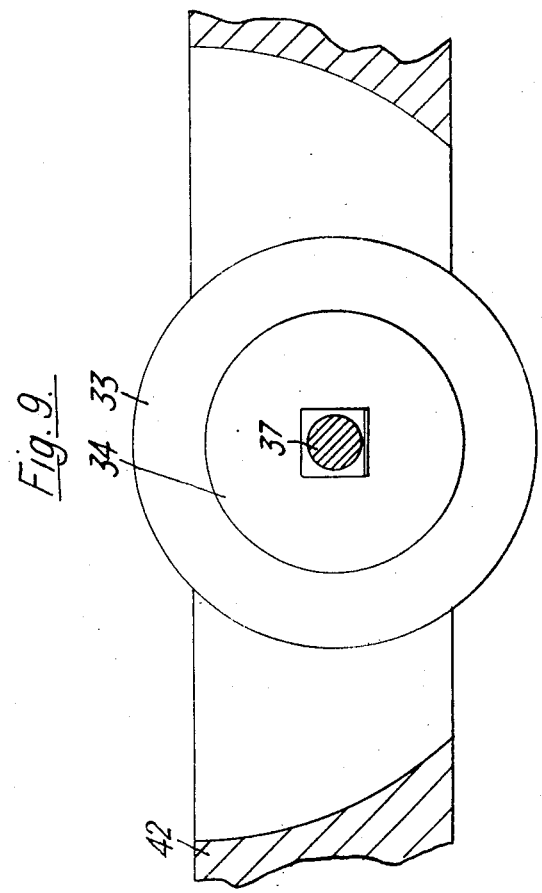
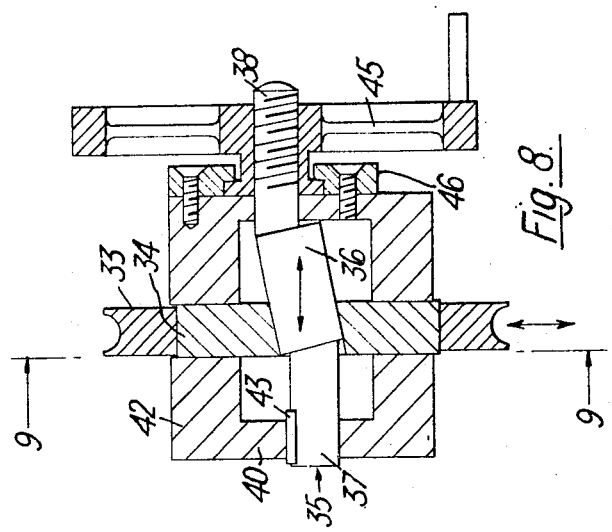

APPARATUS FOR MEASURING LOADS IN ROPES

This is a continuation of application Ser. No. 741,472, filed July 1, 1968.

The present invention relates to an apparatus for measuring the loading of a rope, the expression "rope" as employed hereinafter being intended to include cables.

For measuring the loading of a rope, it has previously been proposed to provide an apparatus having means for engaging the rope at three spaced positions for deflecting the rope, and means for measuring distortion of a resilient member, in response to the rope deflection, as measure of the loading of the rope.

It is an object of the present invention to provide an apparatus as described above with improved means for deflecting the rope.

The present invention provides an apparatus for measuring the loading of a rope, comprising three rope engagement members spaced apart along a resilient support for engaging a rope, one of the rope engagement members being a rope deflector which is displaceable relative to the support for deflecting the rope, and means for measuring distortion of the resilient support in response to the rope deflection, wherein the rope deflector is carried on a carrier connected to an adjustment member and is displaceable by eccentric pivotation or sliding of the rope deflector on the carrier upon movement of the carrier in response to rotation of the adjustment member.

The invention will be more readily understood from the following description of an embodiment thereof, given by way of example, with reference to the accompanying drawings, in which:

FIG. 1 shows a side view of an apparatus for measuring the loading in a rope, the apparatus being shown in position on the rope;

FIG. 2 shows a view taken in section along the line 2—2 of FIG. 1; and

FIG. 3 shows a side view of a modification of the apparatus of FIGS. 1 and 2;

FIG. 4 shows a view taken in section along the line 4—4 of FIG. 3;

FIG. 5 shows a partial side view of another modification of the apparatus of FIGS. 1 and 2;

FIG. 6 shows a side view of a further modification of the apparatus of FIGS. 1 and 2;

FIG. 7 shows a still further modification of the apparatus of FIGS. 1 and 2;

FIG. 8 shows a view taken in transverse section through apparatus for measuring the loading of a rope employing a wedging action to deflect the rope; and FIG. 9 shows a view taken in section along the line 9—9 of FIG. 8.

As shown in the drawing, a rope 1 extends through apparatus comprising a resilient support in the form of a beam 2 on which two rollers 3 are freely rotatably mounted on arms 4 at the ends of the beam 2. A roller 5 is freely rotatably mounted on a carrier in the form of an axle 6 which, as shown in FIG. 2 is rigid with a cylindrical member 6a from which extends an adjustment member in the form of a handle 7. Axle 6 has an axis A1 and roller 5 has an axis A2 as shown in FIGS. 1 and 2. The cylindrical member 6a is rotatable relative to the beam 1, and the axle 6 and roller 5 are eccentrically disposed relative to the cylindrical member 6a, so that by rotating the cylindrical member 6a by means of the handle 7, the roller 5 can be pressed against the rope 1. The roller 5 thus serves as a rope deflector for deflecting the rope 1.

An arm 8 is releasably secured at one end thereof by screws 9 to one end of the beam 2, and the other end 10 of the arm 8 carries a dial gauge 11 for mechanical measurement of bending of the beam 2 as described below.

Four electrical resistance strain gauges 12 are cemented to the frame and are connected in a bridge circuit for electrical measurement of the bending of the beam.

By unscrewing the screws 9, the arm 8 and dial gauge 11 can be removed when mechanical measurement by the dial gauge 11 is not required. However, if it is not required to have the arm 8 removable, the beam 2 may be made in one piece with the arm 8.

The operation of the above-described apparatus is as follows:

For measuring the loading in the rope 1, the apparatus is positioned with the roller 5 at one side of the rope and the rollers 3 at the opposite side of the rope. The handle 7 is then manually rotated through 180° into the position in which it is shown in FIG. 1, which causes the roller 5 to move relative to the rollers 3 and outwardly from the beam 2, thereby deflecting the rope 1.

This deflection of the rope 1 imposes a strain on the beam 2 proportioned to the loading in the rope 1, and the beam 2 is consequently distorted by bending. The distortion of the beam 2, measured by the dial gauge 11 or the bridge circuit incorporating the strain gauges 12, represents the loading in the rope 1.

The electrical resistance strain gauges 12 are wire or foil strain gauges for long term stability and may be temperature compensated. Alternatively, semi-conductor strain gauges may be employed with a simple read-out indicator.

Instead of manual actuation of the rope deflector roller 5 by means of the handle 7, the cylindrical member 6a and the handle 7 may be replaced by an electric motor drive as shown in the modified apparatus illustrated in FIGS. 3 and 4. In this modification, the cylindrical member 6a is replaced by a sprocket wheel 6b driven through an endless chain 13 from a sprocket wheel 14 secured to a shaft 14a which is rotatable in one end of the beam 2. The shaft 14a is secured to a worm wheel 15, which is driven by an electric motor 16 through a worm 17, the motor 16 being secured to an extension 2a of the beam 2 by screws 18.

The electric motor 16 can be switched on from a remote control point to deflect the rope 1, a switch actuator (not shown) being provided on the sprocket wheel 6b for actuating a microswitch (not shown) to de-energize the electric motor 16 when the roller 5 has deflected the rope 1 by the required amount.

The electric motor 16 may be replaced by a handwheel, as shown in FIG. 5, in which there is shown a modification of the apparatus of FIGS. 3 and 4. In this modification, a worm 18 is secured to a shaft 18a journalled in shaft bearings 18b fixed to the beam 2. The worm 18 meshes with the worm wheel 15 and can be rotated by the handwheel, which is indicated by reference numeral 19 and fixed to the shaft 18a.

A further modification of the apparatus is illustrated in FIG. 6 and has a crank wheel 6c connected by a connecting rod 22 to a piston rod 23, the deflector roller 5 being eccentrically connected to the crank wheel 6c.

A piston head 23a on the piston rod 23 is slidable in a cylinder 24 secured to a mounting plate 2b carried by the beam 1, oil supply and discharge pipes 24a and 24b being connected to the cylinder 24 for supplying oil to displace the piston head 23a by an amount sufficient to rotate the crank wheel 6c through slightly less than 180°.

In the apparatus shown in FIG. 7, three rollers are again provided for engaging the rope 1, but in this case the middle roller, indicated by reference numeral 3a, is rotatable about an axis which is fixed relative to the beam 1, and a movable deflector roller (not shown) is mounted at the left hand end of the beam 2, as viewed in FIG. 7, the deflector-roller being freely rotatable on a carrier axle (not shown) which is carried eccentrically on an axle 27 of a worm wheel 28. An adjustment member in the form of handwheel 29 connected to a shaft 30 which is journalled in bearings 31 and secured to a worm 32 is provided for rotating the axle 27 to deflect the rope 1.

Instead of employing an eccentrically mounted deflector roller, the apparatus shown in FIGS. 8 and 9 has a deflector roller 33 freely rotatably mounted on a hub 34 which is slidably supported on a carrier in the form of a shaft 35. More particularly, the hub 34 is slidable on a middle portion 36 of the shaft 35, the shaft portion 36 having a rectangular cross-section and being inclined relative to end portions 37 and 38 of the shaft 35. The shaft end portion 37 is slidable in a wall 40 of a hollow portion of a beam 42 and is keyed to the wall 40 by a key 43. The shaft end portion 38 is in threaded engagement with an adjustment member in the form of a handwheel 45 which is rotatably secured to the beam 42 by a thrust plate 46.

The beam 42 is provided with a further pair of rope engagement rollers similar to the rollers 3 of FIG. 1 and with an arm and dial gauge and/or electrical strain gauges similar to those described above for measuring distortion of the rope.

In operation of this apparatus, the handwheel 45 is rotated to cause the shaft 35 to move to the left, as viewed in FIG. 8, i.e., in a direction inclined relative to the axis of the shaft middle portion 36. The hub 34 is prevented from moving in this direction and is consequently moved perpendicular to this direction by a wedging action between the shaft middle portion 36 and the hub 34. In this way, the deflector roller 33 is displaced relative to the beam 42 to deflect the rope. Instead of the handwheel 45, an adjustment member rotatable by an electric motor or hydraulic means may be provided for displacing the shaft 35.

In each of the above-described apparatuses, the rollers can be readily replaced by rollers of different dimensions for adaptation to various rope thicknesses.

The above described apparatuses are simple to operate and may be employed e.g., to measure loadings in ropes such as stay wires for radio and yacht masts, endless rope conveyors, catenary wires and signal wires.

The apparatuses are of rigid and readily portable construction and can be fitted onto the rope while the rope is taut and without having to remove and replace any part of the apparatus.

Since the rollers are freely rotatable, the apparatuses may be used on running ropes, in which case any convenient means may be used for anchoring the apparatus. For use with plastics protected wires, the rollers may be coated with plastics material to avoid damage to the wires.

I claim:

1. An apparatus for measuring the loading of an elongate member, comprising a resilient elongate support, first and second engagement members spaced apart along said resilient support for engaging one side of said elongate member, a carrier member pivotable relative to said resilient support about a first axis substantially midway between said first and second engagement members along said resilient support, a third engagement member mounted on said carrier member and pivotable relative to said support about a second axis for engaging the opposite side of said elongate member, said carrier member being pivotable about said first axis from a first position, in which said deflector is fully released into a second position, in which said deflector is fully displaced by the maximum possible distance towards said elongate member for deflecting said elongate member, said first and second axes being aligned with the reaction force exerted by said elongate member on said third displacement member when the latter is in said second position, means for effecting said pivotation of said carrier member, and means for measuring distortion of said resilient support on movement of said displaceable deflector into said second position, said apparatus being open at one side thereof to allow engagement of said engagement members with said elongate member by relative lateral movement of said apparatus and said elongate member.

2. An apparatus as set forth in claim 1, wherein said means for effecting pivotation comprise a handle fixed to said carrier.

3. An apparatus as set forth in claim 1, further comprising an arm secured by one end thereof to the support and extending along and spaced from the support, said distortion measuring means comprising a mechanical gauge acting between said support and the free end of said arm.

4. An apparatus as set forth in claim 1, wherein said first, second and third engagement members each comprise a freely rotatable roller, means being provided for releasably securing said rollers to said support, whereby said rollers are readily replaceable by rollers of different dimensions.

5. An apparatus as set forth in claim 1, wherein said pivotation means comprises an electric motor.

6. An apparatus as claimed in claim 1, wherein said pivotation means comprises a piston and cylinder and a crank.

7. An apparatus as claimed in claim 1, wherein said pivotation means comprises a handwheel, and a worm and worm connecting said handwheel to said carrier.

8. An apparatus for measuring the loading of an elongate member, comprising a resilient elongate support, three engagement members spaced apart along said resilient support for engaging said elongate member, a carrier mounted on said support, one of said engagement members comprising a displaceable deflector member mounted on said carrier, a surface on said carrier engaging said deflector member, means mounting said carrier for movement relative to said deflector in a direction inclined to said surface, and means for effecting the movement of said carrier in said direction to move said deflector member from a released position and to an engaged position for deflecting said resilient support, and means for measuring the deflection of said resilient support as an indication of the loading of said elongate member.

9. An apparatus as set forth in claim 8, wherein said means for effecting movement of said carrier comprise a manually rotable member in threaded engagement with said carrier.

10. An apparatus as claimed in claim 8, wherein the three rope engagement members each comprise a freely rotatable roller.

11. An apparatus as claimed in claim 10, wherein the rollers are replaceable by rollers of different dimensions for adapting the apparatus to different rope thicknesses.

12. An apparatus as claimed in claim 11, wherein the distortion measuring means comprise a mechanical gauge.

13. An apparatus as claimed in claim 12, wherein the mechanical gauge is mounted on an arm extending from the support member.

14. An apparatus as claimed in claim 13, wherein the arm is movably connected to the support member.

15. An apparatus as claimed in claim 8, wherein the measuring means comprise an electrical strain gauge connected to the resilient support.

16. An apparatus for measuring the loading of an elongate member, comprising a resilient elongate support, first and second engagement members spaced apart along said resilient support for engaging one side of said elongate member, a carrier member pivotable relative to said resilient support about a first axis substantially midway between said first and second engagement members along said resilient support, a third engagement member mounted on said carrier member and pivotable relative to said support about a second axis for engaging the opposite side of said elongate member, said carrier member being pivotable about said first axis from a first position, in which said deflector is fully released into a second position, in which said deflector is fully displaced by the maximum possible distance towards said elongate member for deflecting said elongate member, means for effecting said pivotation of said carrier member, and means for measuring distortion of said resilient support on movement of said displaceable deflector into said second position, said apparatus being open at one side thereof to allow engagement of said engagement members with said elongate members by relative lateral movement of said apparatus and said elongate member.

* * * * *